United States Patent
Trigg

[15] 3,668,566
[45] June 6, 1972

[54] PHASE-LOCKED TRACKING FILTER

[72] Inventor: Douglas F. Trigg, Orleans, Ontario, Canada

[73] Assignee: Canadian Patents and Development Limited, Ottawa, Ontario, Canada

[22] Filed: Dec. 10, 1970

[21] Appl. No.: 96,880

[30] Foreign Application Priority Data

Nov. 4, 1970 Canada ..................................097371

[52] U.S. Cl. ..............................................333/17, 333/70 R
[51] Int. Cl. ..........................................................H03h 7/10
[58] Field of Search ..........................333/17, 70, 18; 334/11; 325/17, 63, 65, 174, 184, 457, 477, 489, 490

[56] References Cited

UNITED STATES PATENTS 2,453,988 11/1948 Guanella..............................333/17 X
3,281,721 10/1966 Clark.......................................333/17
3,281,723 10/1966 Mercer....................................333/18
3,355,667 11/1967 Bruene.................................333/17 X

*Primary Examiner*—Paul L. Gensler
*Attorney*—James R. Hughes

[57] ABSTRACT

A phase-locked tracking filter in which the input and output voltages of a band-pass filter are compared as to phase and a control voltage produced to vary the characteristics of the filter to force the filter to "track" and provide maximum noise rejection of a desired input frequency. The phase comparison and feedback means includes, in the preferred version of the invention, inverting and non-inverting Schmitt triggers, a monostable multivibrator and a flip-flop phase-sensitive detector to provide a square wave voltage whose mean DC value is related to the phase difference. This voltage is used to control and vary the characteristics of the band-pass filter.

11 Claims, 4 Drawing Figures

INVENTOR
DOUGLAS F. TRIGG
By [signature]
AGENT

INVENTOR
DOUGLAS F. TRIGG
By J. R. Hughes
AGENT

PHASE-LOCKED TRACKING FILTER

This invention relates to band-pass filters and particularly to phase-locked tracking filters having a feedback correction signal path to force the filter characteristics such as to give maximum noise rejection relative to the desired signal.

Tracking filters are known that "track" the input signal by measuring the frequency of this signal and generating an electrical voltage proportional to the frequency. This voltage is then used to modify the filter characteristics in the desired manner. This system depends upon careful selection and matching of components to produce a correction in filter characteristics which closely approximates the desired result. As the "Q" of the filter increases this tracking becomes more and more difficult to satisfactorily achieve.

U.S. Pat. 3,187,275 issued to O. C. Stanley on June 1, 1965 describes a tracking filter having a phase comparison arrangement for providing a feedback signal to automatically tune the filter. This is a useful circuit but suffers certain drawbacks in that the inter-electrode capacitances of vacuum tubes are varied to tune the band-pass filter. These capacitances, effectively in parallel with a fixed capacitor and inductance, determine the Q of the filter and so the Q changes with changing input frequency. This means that the selectivity or ability to reject noise decreases with decreasing input frequency.

It is an object of the present invention to provide a tracking filter in which the Q of the filter remains substantially constant over the entire range of operation.

This and other objects of the invention are achieved by a phase-locked tracking filter in which the difference in phase between the input signal and the output signal are sensed and a feedback signal is obtained and applied to the filter in the correct sense to force the filter characteristics to give maximum noise rejection relative to the desired signal. In a preferred embodiment of the invention, pulse waveform circuit logic is employed to provide the feedback signal. This approach eliminates the need for a 90° phase shifter, a device that is difficult to achieve in practice.

Figure 1:
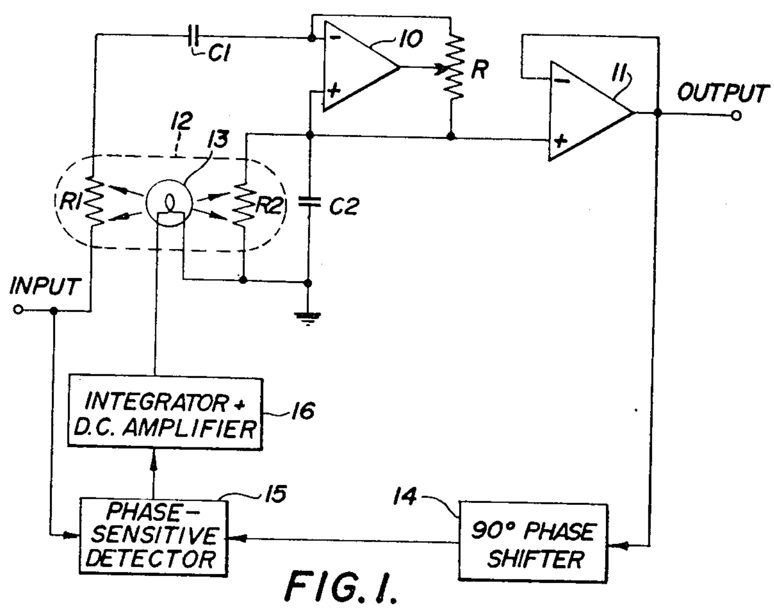
Figure 2:
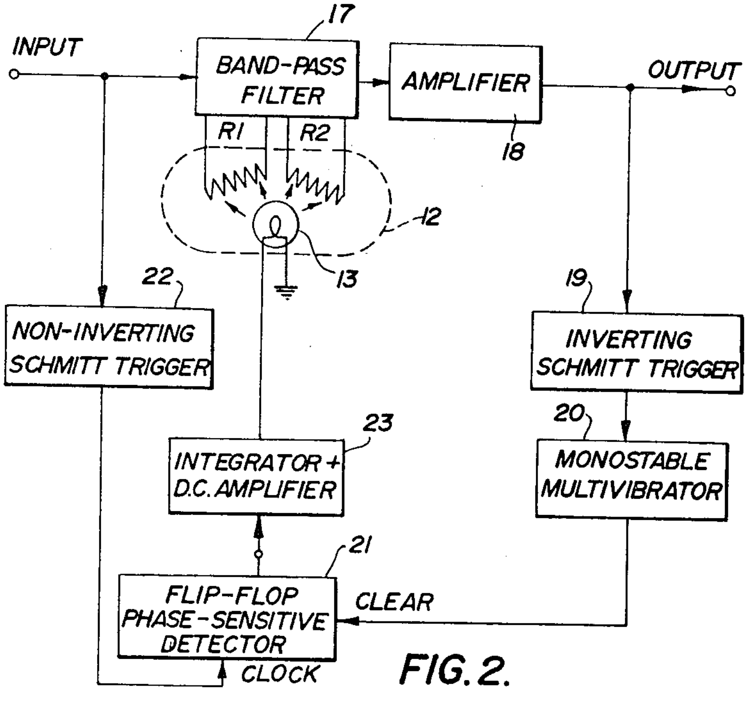
Figure 3:
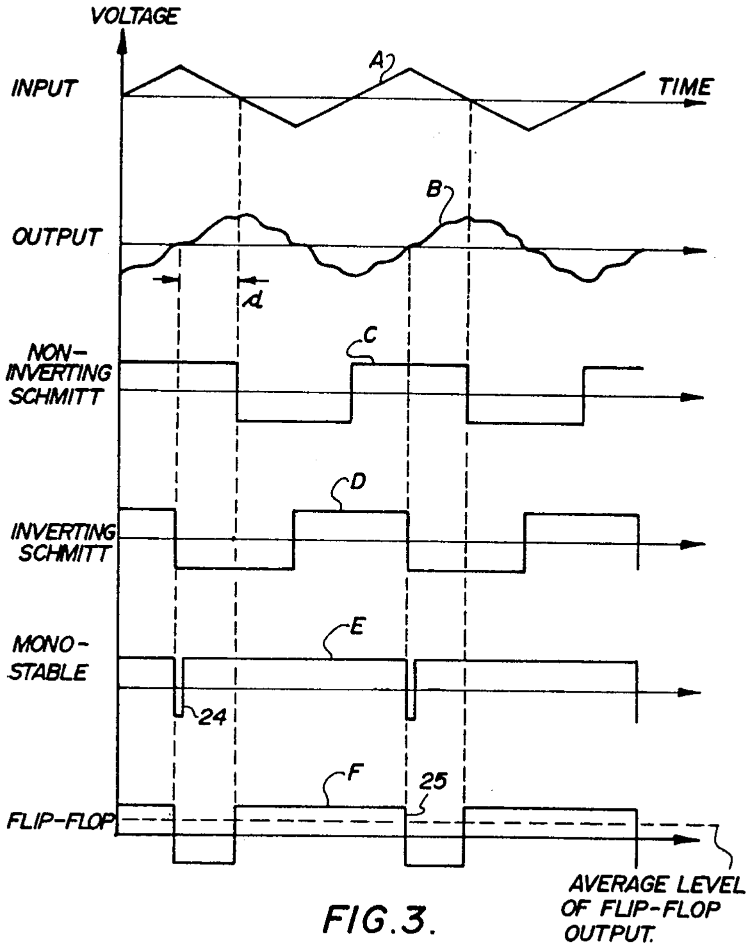
Figure 4:
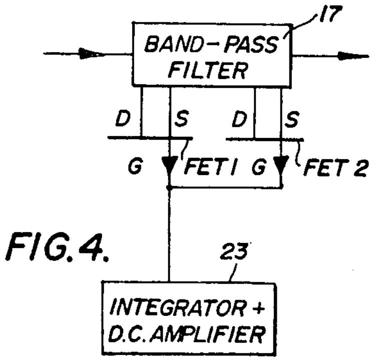

In drawings which illustrate embodiments of the invention,

FIG. 1 is a circuit diagram of a version of the device requiring a 90° phase shifter, FIG. 2 is a circuit diagram of a preferred version of the device where the phase shifter is not required, FIG. 3 is a graph of typical waveform outputs of the circuit elements of the FIG. 2 version of the filter, and FIG. 4 is an alternative control device for changing the characteristics of the filter.

Referring to FIG. 1, a generally conventional band-pass filter is shown as made up of operational amplifiers 10 and 11, capacitors C1 and C2, and resistors R, R1, and R2. Resistors R1 and R2, which would normally be equal in value form part of dual photo-sensitive resistor 12 which is a control device operating on the principle of varying light from light bulb 13 changing the resistance values of resistors R1 and R2. A signal is taken from the output of the filter and shifted 90° in phase shifter 14 and is then applied to phase-sensitive detector 15 where it is compared with a voltage from the input of the filter. Changes in phase of the output in relation to the input cause changes in the output feedback voltage from detector 15. This voltage is integrated to remove ripple and provide a smooth DC voltage level. This is amplified and applied to the filament of bulb 13. The center frequency of operation of the filter is $f_o = (1)/(2R1C1$, assuming $R1 = R2$ and $C1 = C2$. It will be seen that changing R1 and R2 changes the central frequency characteristic of the filter and the filter will be phase-locked and forced to give maximum noise rejection relative to the desired input signal.

FIG. 2 is the preferred version of the filter and has significant advantages not only over the prior art devices but also over the filter of FIG. 1. Band-pass filter 17 has tuning control element 12 made up of resistors R1, R2, and bulb 13. The filter output is amplified in amplifier 18 whose output voltage is applied to inverting Schmitt trigger 19 whose output is applied to monostable multivibrator 20. The signal pulses from multivibrator 20 are applied to a flip-flop phase-sensitive detector 21 which also has an input from the filter input via non-inverting Schmitt trigger 22. Schmitt triggers are well-known and widely used. Their function in this circuit is to take the input and output signal voltages of varying amplitude and convert them to symmetrical square wave voltages of constant amplitude. The monostable multivibrator takes the square wave signal from the Schmitt trigger and converts it to a series of very narrow triggering pulses.

The flip-flop phase sensitive detector is preferably a standard J–K flip-flop connected to operate as a detector. The square waves derived from the non-inverting Schmitt trigger are applied to the Clock input of the J–K flip-flop and the narrow pulses from the monostable multivibrator are applied to the Clear input. The result at the output of the flip-flop is a series of square wave pulses whose width varies in proportion to the relative phase of the band-pass input and output voltages. The average DC feedback voltage at the flip-flop output thus varies in proportion to phase difference changes. The system has an inherent 90° phase shift and removes the requirement for a 90° phase shifter as such.

The operation of this circuit will be more clearly seen from the waveform graphs of FIG. 3 where A is a representative input voltage (in this case a triangular waveform) and B is the output waveform of the incorrectly tuned filter which has been altered in shape but which has been shifted in phase by an amount "*d*". The non-inverting and inverting Schmitt triggers provide square waves C and D that sharply delineate the phase shift. The trailing edge of D results in a narrow negative pulse 24 in the waveform E at the output of the multivibrator 20. The flip-flop detector 21 is connected such that each negative edge of pulse 24 sets the flip-flop detector 21 to the low voltage level and each negative edge from the non-inverting Schmitt trigger sets the flip-flop output to the high voltage. A non-symmetrical square wave output results, with a non-zero average DC level whose magnitude and polarity depend alone upon phase difference between the band-pass filter input and output.

Referring again to FIG. 2, the integrator and DC amplifier 23 smoothes the flip-flop output and amplifies it before it is applied to the bulb 13 of tuning control element 12 which is arranged to vary the values of resistors R1 and R2. The characteristics of the band-pass filter are thus forced to their optimum operating point for the input signal in question. The tuning error signal is independent of the amplitude of the filter input and output signals.

FIG. 4 shows an alternative to the dual photo-sensitive resistor used as a control element for the filter 17. Two field effect transistors FET1 and FET2 act as variable resistors (current controlling devices) controlled from the DC integrator and amplifier 23. These are well known semi-conductor devices. Other types of control devices, e.g. voltage-variable capacitors could also be used.

The above described filters will have application in magnetometers using nuclear or atomic precession to measure the earth's magnetic field from a survey aircraft or ship and in electromagnetic prospecting using continuous-wave low-frequency electromagnetic radiation.

What is claimed is:

1. A phase-locked tracking filter comprising:

a. a band-pass filter including at least one resistor and one capacitor such that on change of the value of one of the resistor and capacitor, there is a change of central frequency of operation of the overall filter for maximum noise rejection relative to the desired input signal to the filter, b. a 90° phase shifter connected to the output of the band-pass filter, c. a phase-sensitive detector for comparing the output voltage from the phase-shifter and a voltage signal from the input of the filter and providing a control signal related to the phase difference between the input and output voltages of the filter, d. an integrator and amplifier for smoothing and amplifying said control signal, and e. a tuning control means connected to said integrator and amplifier for varying the value of one of said resistor and capacitor on change of value of the control signal.

2. A phase-locked tracking filter as in claim 1 wherein the tuning control means is a dual photo-sensitive resistor.

3. A phase-locked tracking filter comprising:

a. a band-pass filter including at least one electrical element such that on change of the electrical value of said element there is a change of central frequency of operation of the overall filter for maximum noise rejection relative to a desired input signal to the filter, b. a first Schmitt trigger connected to the filter output, c. a second Schmitt trigger connected to the filter input, one of said Schmitt triggers being an inverting type and the other a non-inverting type for providing square voltages of the same phase as said input or output filter voltages, d. a monostable multivibrator for producing a narrow control pulse connected to one of said Schmitt triggers, e. a phase-sensitive detector for accepting signals from the monostable multivibrator and the other Schmitt trigger and providing a square wave control signal output whose mean DC value is related to the phase difference between input and output filter voltages, f. integrator and amplifier means for smoothing and amplifying the output of said detector, and g. tuning control means connected to said integrator and amplifier for varying the value of the said element on change of value of said control signal.

4. A phase-locked tracking filter as in claim 3 wherein the tuning control means is a dual photo-sensitive resistor.

5. A phase-locked tracking filter as in claim 3 wherein the tuning control means is a field effect transistor.

6. A phase-locked tracking filter as in claim 3 wherein the electrical element is a resistor.

7. A phase-locked tracking filter as in claim 3 wherein the electrical element is a capacitor.

8. A phase-locked tracking filter as in claim 3 wherein the electrical element is a solid-state current control device.

9. A phase-locked tracking filter comprising:

a. a band-pass filter including a resistor such that on change of electrical value of the resistor there is a change of central frequency of operation of said band-pass filter, b. a non-inverting Schmitt trigger connected to the input of said filter to provide a square wave voltage in phase with the filter input signal, c. an inverting Schmitt trigger connected to the output of said filter to provide a square wave 180° out of phase with the filter output, d. a monostable multivibrator connected to the output of the inverting Schmitt trigger to provide a narrow negative pulse at the negative edge of the square wave from the trigger, e. a flip-flop phase-sensitive detector for accepting the narrow negative pulses and the output from the non-inverting Schmitt trigger and providing a square wave voltage whose mean DC value is related to the phase difference between filter input and output voltages, f. means for integrating and amplifying said square wave voltage, and g. tuning control means connected to the integrating and amplifying means for varying the electrical value of said resistor.

10. A phase-locked tracking filter comprising:

a. a band-pass filter including a capacitor such that on change of electrical value of the capacitor there is a change of central frequency of operation of said band-pass filter, b. a non-inverting Schmitt trigger connected to the input of said filter to provide a square wave voltage in phase with the filter input signal, c. an inverting Schmitt trigger connected to the output of said filter to provide a square wave 180° out of phase with the filter output, d. a monostable multivibrator connected to the output of the inverting Schmitt trigger to provide a narrow negative pulse at the negative edge of the square wave from the trigger, e. a flip-flop phase-sensitive detector for accepting the narrow negative pulses and the output from the non-inverting Schmitt trigger and providing a square wave voltage whose mean DC value is related to the phase difference between filter input and output voltages, f. means for integrating and amplifying said square wave voltage, and g. tuning control means connected to the integrating and amplifying means for varying the electrical value of said capacitor.

11. A phase-locked tracking filter comprising:

a. a band-pass filter including a field effect transistor such that on change of electrical value of the transistor there is a change of central frequency of operation of said band-pass filter, b. a non-inverting Schmitt trigger connected to the input of said filter to provide a square wave voltage in phase with the filter input signal, c. an inverting Schmitt trigger connected to the output of said filter to provide a square wave 180° out of phase with the filter output, d. a monostable multivibrator connected to the output of the inverting Schmitt trigger to provide a narrow negative pulse at the negative edge of the square wave from the trigger, e. a flip-flop phase-sensitive detector for accepting the narrow negative pulses and the output from the non-inverting Schmitt trigger and providing a square wave voltage whose mean DC value is related to the phase difference between filter input and output voltages, f. means for integrating and amplifying said square wave voltage, and g. tuning control means connected to the integrating and amplifying means for varying the electrical value of said transistor.

* * * * *